(12) United States Patent
Baughman

(10) Patent No.: US 6,850,224 B2
(45) Date of Patent: Feb. 1, 2005

(54) WEARABLE ERGONOMIC COMPUTER MOUSE

(75) Inventor: Pamela M Baughman, Lewis Run, PA (US)

(73) Assignee: Carba Fire Technologies, Inc., Lewis Run, PA (US)

( * ) Notice: Subject to any disclaimer, the term of this patent is extended or adjusted under 35 U.S.C. 154(b) by 682 days.

(21) Appl. No.: 09/944,491

(22) Filed: Aug. 27, 2001

(65) Prior Publication Data

US 2003/0038783 A1 Feb. 27, 2003

(51) Int. Cl.[7] .................................................. G09G 5/08
(52) U.S. Cl. ....................... 345/163; 345/156; 345/157
(58) Field of Search ................................ 345/156–184; 74/471 XY

(56) References Cited

U.S. PATENT DOCUMENTS

| 4,905,001 | A | | 2/1990 | Penner |
| 4,954,817 | A | | 9/1990 | Levine |
| 5,355,147 | A | | 10/1994 | Lear |
| 5,444,462 | A | | 8/1995 | Wambach |
| 5,453,759 | A | * | 9/1995 | Seebach ..................... 345/158 |
| 5,481,265 | A | | 1/1996 | Russell |
| 5,489,922 | A | | 2/1996 | Zloof |
| 5,576,733 | A | | 11/1996 | Lo |
| 5,581,484 | A | | 12/1996 | Prince |
| 5,638,092 | A | | 6/1997 | Eng et al. |
| 5,648,798 | A | | 7/1997 | Hamling |
| 5,706,026 | A | | 1/1998 | Kent et al. |
| 5,754,126 | A | | 5/1998 | Hillbrink et al. |
| 5,760,766 | A | * | 6/1998 | Auber et al. ................. 345/167 |
| 5,764,164 | A | | 6/1998 | Cartabiano et al. |
| 5,796,354 | A | | 8/1998 | Cartabiano et al. |
| 5,832,296 | A | | 11/1998 | Wang et al. |
| 5,945,978 | A | | 8/1999 | Holmes |
| 6,072,471 | A | | 6/2000 | Lo |
| 6,097,369 | A | | 8/2000 | Wambach |
| 6,141,643 | A | | 10/2000 | Harmon |
| 6,154,199 | A | | 11/2000 | Butler |
| 6,222,526 | B1 | * | 4/2001 | Holmes ....................... 345/161 |
| 6,262,715 | B1 | | 7/2001 | Sawyer |
| 6,266,047 | B1 | | 7/2001 | Benja-Athon |
| 6,297,808 | B1 | * | 10/2001 | Yang .......................... 345/167 |
| 6,545,667 | B1 | * | 4/2003 | Lilenfield ................... 345/169 |
| 6,587,090 | B1 | * | 7/2003 | Jarra .......................... 345/156 |
| 2001/0035856 | A1 | * | 11/2001 | Myers ........................ 345/156 |
| 2002/0067342 | A1 | * | 6/2002 | Proper ........................ 345/163 |
| 2002/0101401 | A1 | * | 8/2002 | Movahed ................... 345/156 |
| 2002/0163495 | A1 | * | 11/2002 | Doynov ...................... 345/156 |
| 2002/0175894 | A1 | * | 11/2002 | Grillo ......................... 345/156 |
| 2003/0137489 | A1 | * | 7/2003 | Bajramovic ................. 345/158 |
| 2003/0174124 | A1 | * | 9/2003 | How .......................... 345/167 |

* cited by examiner

Primary Examiner—Xiao Wu
(74) Attorney, Agent, or Firm—Edward W. Goebel, Jr.; Jon L. Woodard; MacDonald Illig Jones & Britton LLP

(57) ABSTRACT

A computer mouse is designed to be worn on the hand of a computer user for use in conjunction with various types of computer systems. A base attaches to the user's hand through the use of flexible adjustment straps. The base houses the electronic and/or computer circuitry needed for developing and transmitting electrical signals to the user's computer system, the signals corresponding to the signals on a conventional mouse.

21 Claims, 5 Drawing Sheets

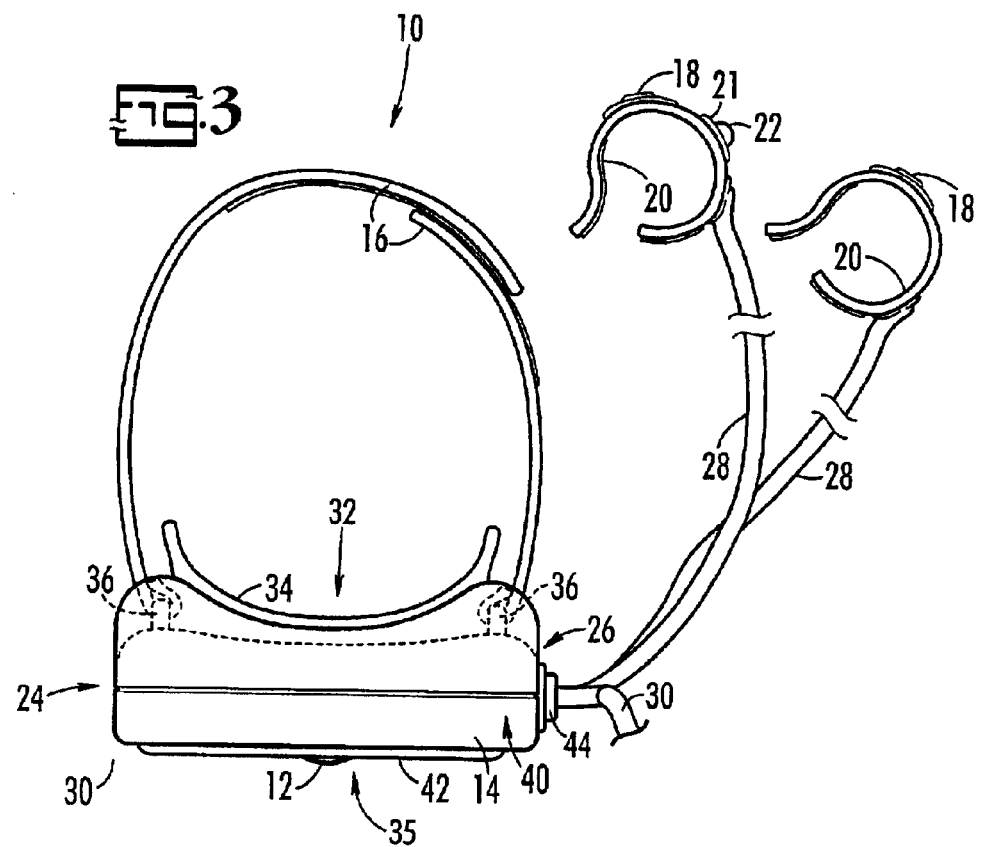
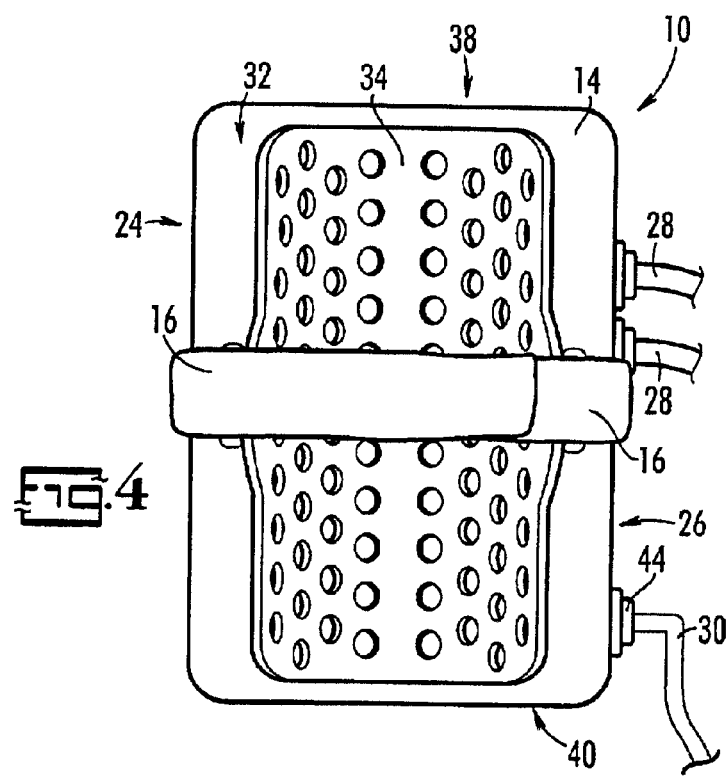

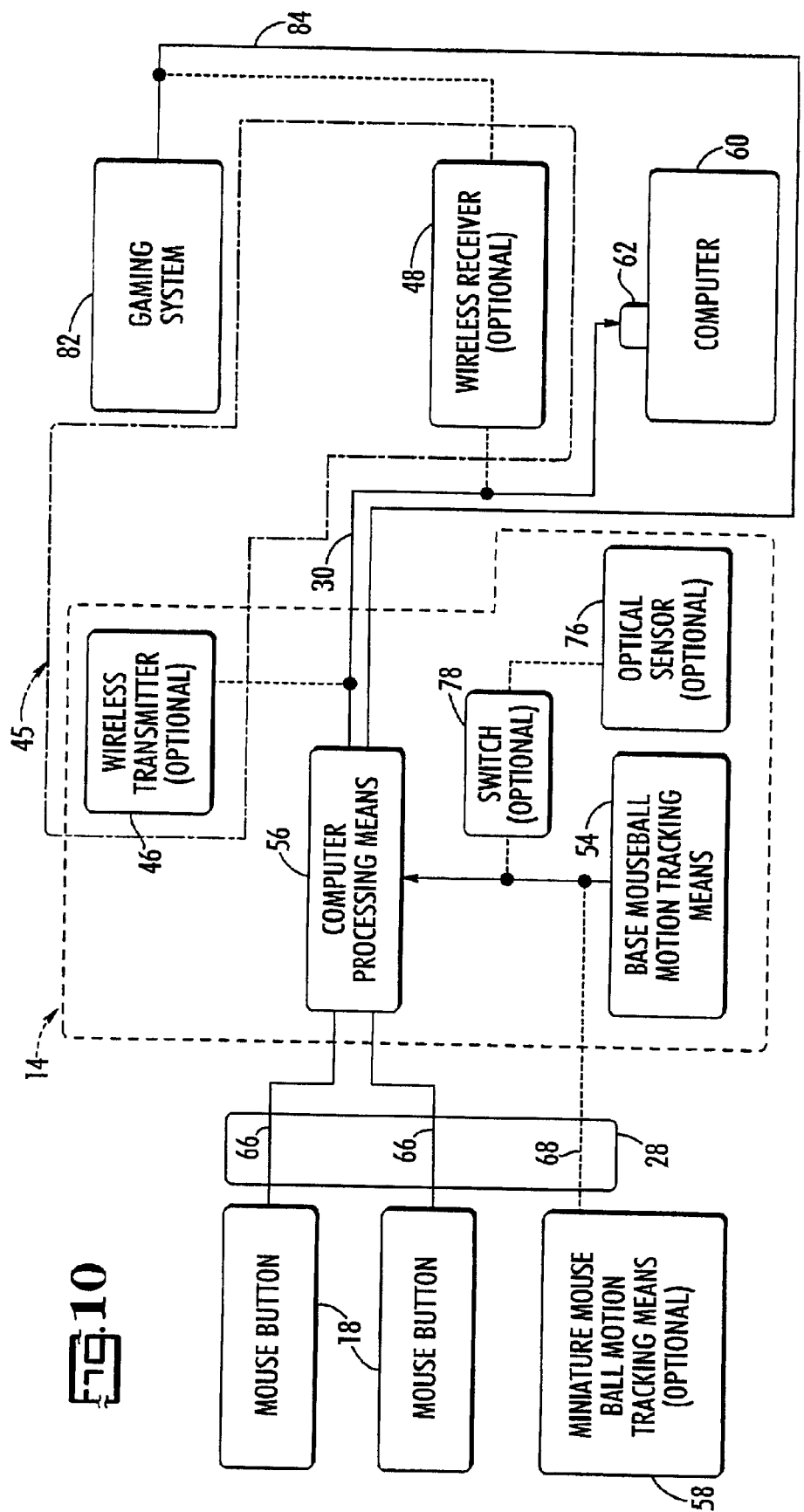

WEARABLE ERGONOMIC COMPUTER MOUSE

FIELD OF THE INVENTION

The present invention relates to computer mice, and more particularly to computer mice that are directly attachable to a user's hand.

BACKGROUND OF THE INVENTION

The computer mouse is a computer input device that was invented to control the movement of a computer's cursor, which is a marker that points to a location on a computer's monitor or display. Since its development the mouse has evolved so that it is now able to perform additional computer functions. This has been made possible through the development of both mouse and non-mouse related hardware and software, e.g., the addition of buttons, or switches, onto the mouse is a good example of hardware development, while software applications which use the input from either the right or left mouse button to perform application specific functions, such as opening or closing an application or a drop-down menu, are a good example of software development.

There are three general types of mice. First, are "mechanical" mice, which have an enclosure on their underside that houses a rubber, plastic, or metal ball. The enclosure allows the ball to move freely in all directions, and mechanical motion sensors, located in the mouseball enclosure, are used to develop a signal that corresponds to the movement of the ball, which is then sent to the computer to move the cursor on the computer display screen. Secondly, "optomechanical" mice basically function in the same way as a mechanical mouse, but use optical sensors to detect mouseball movement. Thirdly, "optical" mice do not have mechanically moving parts, instead they use a laser to detect mouse motion. Besides the types of mice, another classification associated with mice is the method used to connect the mice to a computer. There are several types of connecting methods, a few of the more common are: "serial" mice, which use a cord or wire to connect to a computer's serial port; "PS/2" mice which use a cord or wire to connect to a computer's PS/2 port; and "cordless" mice, which are not physically connected to the computer, but instead use some form of electromagnetic radiation, such as infrared or radio waves, to transmit signals to the computer.

A major shortcoming of computer mice is that they are generally positioned on a user's desk or computer workstation away from the computer keyboard. This requires the user to take a hand away from the keyboard to manipulate the mouse to be able to perform the task that the user is working on. Generally, mouse manipulation requires the user to: look at, or otherwise locate, the mouse; move an arm toward the mouse; bend, cant, and twist the fingers and wrist to grasp the mouse; move the arm and wrist to position the mouse as needed; and bend, cant, and apply pressure with the arm, wrist, and finger to activate the buttons or to perform a scrolling function. Because of this awkward movement, and the amount of movement required during a busy day at a workstation, use of the conventional mouse can cause or aggravate repetitive motion conditions like carpal tunnel syndrome and tendinitis, and can cause muscle pain and cramping. Furthermore, the time and effort required to transition from using the keyboard to using a conventional mouse and, possibly, the distraction caused by diverting a user's gaze away from the computer display, is very inefficient.

Several prior art devices have been developed to overcome some of these disadvantages. With respect to repetitive strain injuries, U.S. Pat. No. 6,266,047 B1, discloses a computer mouse that uses the thumb and little finger instead of the forefinger, middle finger or ring fingers to click the "mouse buttons." According to this invention, it can prevent or eliminate some repetitive strain injuries of the arm by transferring the required muscle movements to bodily structures outside the carpal tunnel. Another example is the U.S. Pat. No. 6,262,715 B1, for an "ergonomic computer mouse." This invention discloses a mouse that provides comfortable and efficient usage of the device by maintaining the user's hand at a large acute angle to the horizontal. Generally, both of these inventions are focused on eliminating repetitive motion problems; either caused by the unnatural twisting of the wrist to grasp and/or manipulate the mouse, and/or the detrimental stretching of some of the fingers to be able to perform the mouse button "clicking" movements. Both of these inventions, however, require the user to move an arm and wrist away from the computer keyboard to locate and grasp the disclosed mice, which may also require the user to avert his (or her) gaze from the computer display.

With respect to the movement away from the keyboard to use the mouse, some inventions have been developed to replace the conventional mouse and/or the keyboard. U.S. Pat. No. 5,581,484, discloses a finger mounted computer input device, which maybe mounted into a fabric glove, and which uses pressure and/or acceleration sensors to develop signals, including mouse pointing, or trackball signals. To initiate the mouse-type signals the user would move his arm away from a pre-set position, and would then press down with his fingertips onto a surface and move his arm in the direction that he wanted the cursor to be repositioned to. This invention, however, does not disclose the ability to perform the mouse button functions, and it does not disclose it being able to perform the mouse/cursor positioning function with the arm and wrist in the neutral "handshake" position. U.S. Pat. No. 6,097,369 discloses a computer mouse glove that uses motion sensors that detect lateral wrist and/or vertical finger movement to develop a signal that can be used to reposition the computer cursor. This invention can also perform mouse click functions through the activation of switches located on various fingers. Since this invention uses motion sensors that develop a signal based on finger and/or wrist movement, this invention requires the mouse functions to be deactivated during normal typing, which is accomplished by using an on-off switch located on the glove. Furthermore, this device is apparently not able to conveniently function with the arm, wrist, and hand, in the neutral "handshake" position, but it does disclose that it can use the forefinger alone for cursor positioning. U.S. Pat. No. 6,154,199, discloses a glove-like article that carries a tracking ball on the side of the index finger for manipulation by the user's thumb, and mouse buttons located on the palm of the glove-like article, which are manipulated by a user's fingers. These previous three inventions, however, still require the use of a user's fingers to either position the cursor or to operate the mouse buttons, which may cause or aggravate repetitive strain injuries.

Therefore, with this stated, there still remains a need for a more efficient and effective way to provide computer mouse functions while limiting the repetitive strain that may cause or aggravate certain repetitive motion conditions, such as carpal tunnel syndrome, tendinitis, or muscle pain and cramping.

SUMMARY OF THE INVENTION

According to its major aspects and briefly recited, the present invention is a computer mouse that is designed to be worn on a computer user's hand for use in conjunction with various types of computer systems including, but not limited to, desktops, laptops, or wearable computing systems. Other uses for this invention include, but are not limited to, the present invention being used as an input device for electronic or computer gaming systems. The mouse includes a base, which attaches to a user's hand through the use of flexible adjustable straps. The base houses the electronic and/or the computer circuitry needed for developing and transmitting electrical signals to the user's computer, or to a gaming system, that correspond to the electrical signals from a conventional mouse. The base, in one of the preferred embodiments, also houses a motion tracking system, which uses the rotational movement of a hard rubber, or any other suitable material, ball (hereinafter referred to as a "mouseball") for creating an electrical signal that would be used to position the computer cursor, or for accomplishing a positioning function in a gaming system. Preferably, in the present invention, this cursor positioning signal is developed by first positioning the user's arm in the neutral "handshake" position, (i.e., a more natural and user-friendly position with respect to repetitive motions), which should place the mouseball against a horizontal surface, and secondly by moving the mouseball across such surface. Also included in the present invention are two mouse buttons, each of which can be attached to either the same finger, or to two fingers of the same hand, through the use of adjustable fingerstraps. Also attached to each fingerstrap is an electrical cable that is in electrical communication with both the base and to one of the mouse buttons. This connecting cable transmits a standard mouse button function signal to the base whenever the mouse button, which is in electrical connection with that respective electrical connecting cable, is pressed. Standard mouse button functions include, but are not limited to, clicking, double-clicking, dragging, and scrolling. In a preferred embodiment, the cursor positioning and mouse button function signals are processed by the electronic and/or computer circuitry contained within the base, and are then input to the user's computer through the use of a computer connecting cable that has a "quick-release" connector for attachment to the base and any one of several common terminating connectors for attachment to the user's computer. Similarly, these mouse signals can be input to a gaming system through the use of a gaming system connecting cable.

As discussed, in one preferred embodiment of the invention, the user's forearm is turned to the neutral "handshake" position, and through the use of arm movement alone, the computer's cursor can be positioned, while simultaneously the user's thumb, instead of the user's fingers, is used to depress either of the mouse buttons to perform a mouse button activated command.

A feature of this invention is that it can be worn on the computer user's hand, which allows the user's arm to remain in a neutral "handshake" position during use, which eliminates the need for the user to cant or bend his wrist to grasp the mouse. Another feature of this invention is that the mouse buttons can be operated by a user's thumb instead of a user's fingers.

The advantage gained by these features is the reduction of awkward arm, wrist, and finger movements that can cause or aggravate repetitive movement based conditions, which can be extremely painful, or, in some instances, even debilitating.

These and other features and their advantages will be apparent to those skilled in the art of computer mice from a careful reading of the Detailed Description of a Preferred Embodiment presented below and accompanied by the following drawings.

BRIEF DESCRIPTION OF THE DRAWINGS

In the figures,

FIG. 3 is a rear view of the ergonomic computer mouse, according to a preferred embodiment of the present invention;

FIG. 4 is a top view of the ergonomic computer mouse base, according to a preferred embodiment of the present invention;

FIG. 10 is a block diagram of the signal path implementation, according to a preferred embodiment of the present invention.

DETAILED DESCRIPTION OF PREFERRED EMBODIMENTS

The term "mouseball," (which is also referred to as "trackball"), refers to the rubber, plastic, or metal ball that is able to move freely in all directions within a housing, and when moved provides mechanical motion to electromechanical, electronic, or optoelectronic motion sensors, which translate this mechanical motion into electrical signals. Together these elements form a "motion tracking system." Typically the "motion tracking system" performs a computer cursor positioning function in which it will generate an electrical signal that corresponds to the rotational movement of the mouseball. This signal is then translated into a corresponding two-dimensional "X" and "Y" axis signal for positioning the computer cursor. This same signal can also be used as a positioning signal for electronic and computer gaming systems.

The term "mouse button function" refers to the well known functions associated with any of the buttons normally found on a standard computer mouse, and the term "mouse function" includes both the "mouse button functions" and the computer cursor positioning function described above.

The term "hand shake position" refers to the position of a user's hand in which the fingers of the hand are generally disposed in a vertical plane with the forefinger being oriented above the other fingers of that hand.

Figure 1:
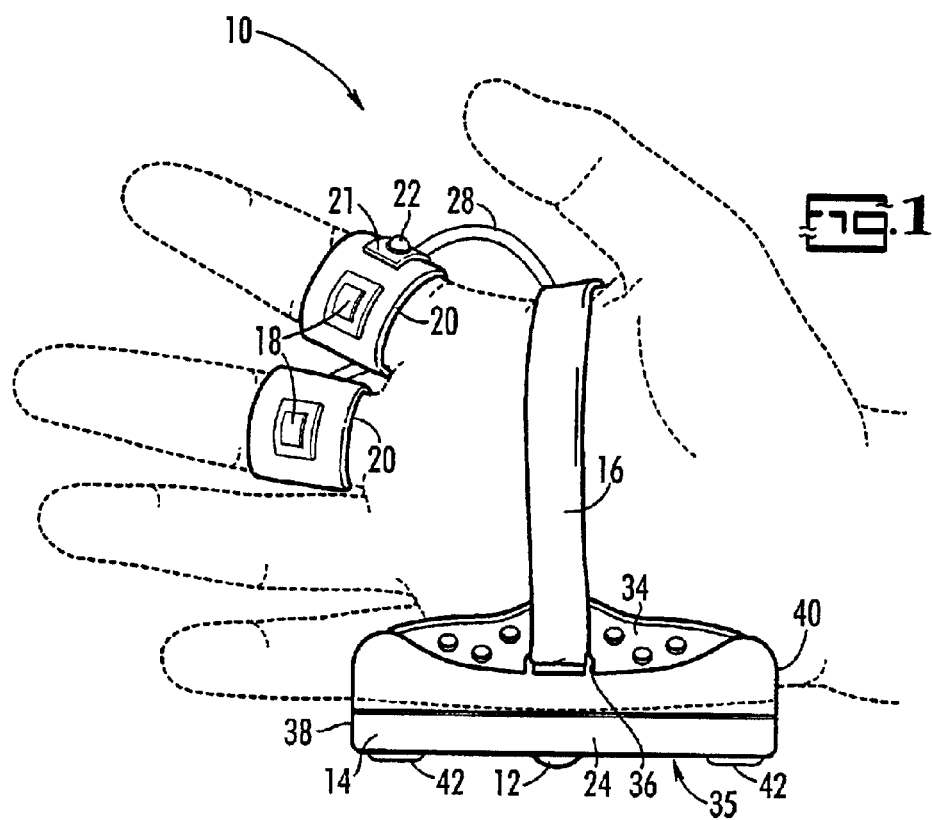
FIG. 1 is left side view of the ergonomic computer mouse, in-use, according to a preferred embodiment of the present invention.
Figure 2:
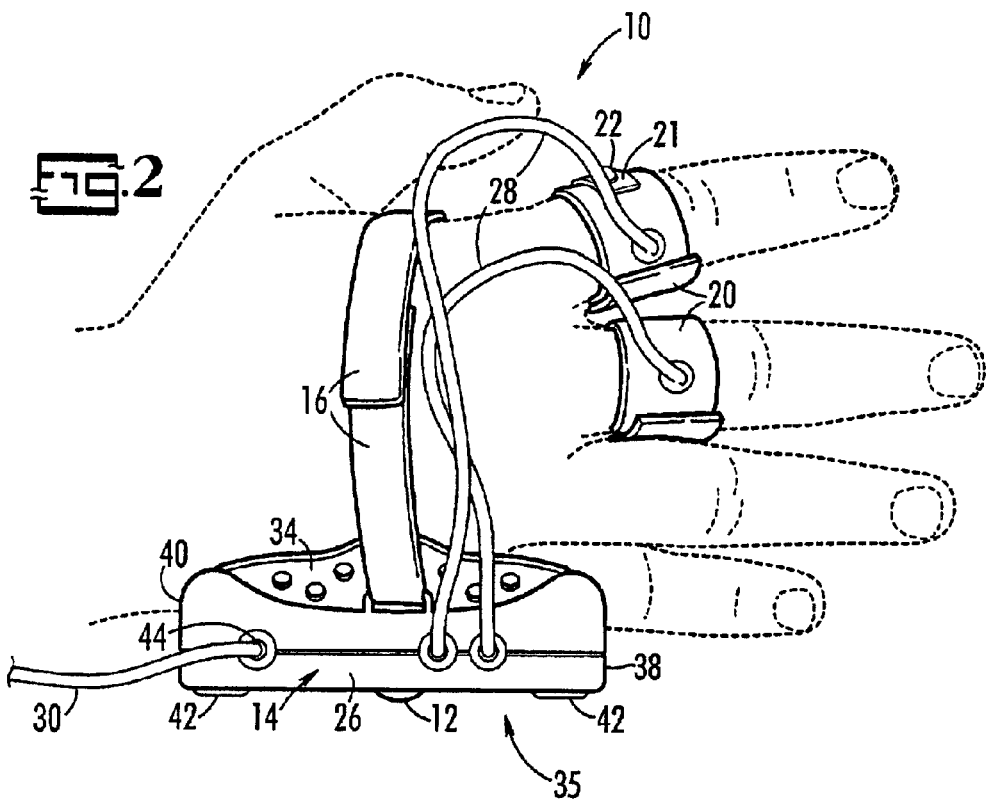
FIG. 2 is a right side view of the ergonomic computer mouse, in-use, according to a preferred embodiment of the present invention.

Referring now to FIGS. 1 and 2, in general there is shown a preferred embodiment for the ergonomic computer mouse 10, which is also being shown in the preferred position for operating the base mouseball 12. In general terms, there is a hand worn ergonomic computer mouse 10 that has a base 14, which is attached to the user's hand by flexible adjustable basestraps 16. The mouse buttons 18 are programmable and are attached to flexible adjustable fingerstraps 20. The basestraps 16 and the fingerstraps 20 can be made adjustable through the use of VELCRO-type straps, a buckle-like fastener or clasp, by forming them of a one-piece elastic material that is generally cylindrically shaped, or through the use of any other suitable method. Persons skilled in the art will be aware of a variety of securement devices that can accomplish the same end as basestraps 16 and the fingerstraps 20. The term VELCRO-type straps includes all variations of hook and loop fasteners including VELCRO brand releasable hook and loop fastening strips. VELCRO is a registered trademark of VELCRO Industries B.V. Corporation Netherlands, Caracao, Netherlands and of Velcro USA, Inc. The fingerstraps 20 can be worn on one, or two, of a user's fingers, which position allows the mouse buttons 18 to be operated by a user's thumb. Optionally, one of the fingerstraps 20 may have a miniature mouseball housing 21 and a miniature mouseball 22 attached, which can also be operated by a user's thumb. Being designed this way, the ergonomic computer mouse 10 places the mouse functions on a user's hand, while still allowing the user to operate the user's computer keyboard. This allows the user to more efficiently transition from entering data on the keyboard to performing a mouse function. Furthermore, because the mouse buttons 18 (and the optional miniature mouseball 22) are operated with a user's thumb instead of his fingers, and because the user's hand is in the handshake position when the base mouseball 12 is being operated, there is less chance of causing or aggravating a repetitive strain injury.

Essentially, the ergonomic computer mouse 10 of this invention has abase 14, which carries the computer processing means, motion tracking means, base attaching means, mouse button function means, mouse button attaching means, mouse button function signal transmitting means, and mouse signal transmitting means.

The preferred embodiment and the best mode of the ergonomic computer mouse 10 of the present invention are described herein. However, it should be understood that the best mode for carrying out the invention hereinafter described is byway of illustration and not by way of limitation. It is intended that the scope of the present invention includes all modifications that incorporate its principal design features, and that the scope and limitations of the present invention are to be determined by the scope of the appended claims and their equivalents.

The ergonomic computer mouse 10 can have any configuration that will allow it to function in the way described. For example, in the embodiment of the ergonomic computer mouse 10 shown in the drawings it is shown as being worn on a user's right hand, or, in other words, as a right-hand model, but the ergonomic computer mouse 10 is not limited to a right-hand embodiment. Preferably, the ergonomic computer mouse 10 can be made in a left-hand or in an either-hand embodiment, as well.

Furthermore, the ergonomic computer mouse 10 can be used in conjunction with various types of computers, computer systems, and with other electronic or computer applications, as an input device, including, but not limited to, desktops, laptops, wearable computing systems, and electronic or computer gaming systems.

Referring now to FIGS. 3-10, the mouse base 14 is made of plastic, but it can be made of any other suitable material. The base 14 has an inside edge 24, and an opposing outside edge 26. Connected to the outside edge 26 is the fingerstrap connecting cables 28, which are used to transmit the mouse function signals to the computer processing means by carrying mouse button wiring 66 (and, possibly, by carrying optional miniature mouseball motion tracking means wiring 68). Fingerstrap connecting cables 28 also provide power to the mouse buttons 18 (and, possibly, to the optional miniature mouseball motion tracking means 58) either from the mouse base 14 or the computer processing means 56 by carrying power wiring 80. Also connected to the outside edge 26, is the computer connecting cable 30, which is used to transmit the mouse signals to the computer, and to provide power to the computer mouse 10. However, it should be recognized that the these cables (28 and 30) can be connected to the base 14 in other orientations. For example, the computer connecting cable 30 can be connected to the back 40 of the base 14. The base 14 has a top 32, to which side a rubber insert 34 is attached, and an opposing bottom side 35. The rubber insert 34 is U-shaped and it is used to provide a comfortable interface between the base 14 and the user's hand while the ergonomic computer mouse 10 is being worn. Integrally formed on the top of the inside edge 24 and the top of the outside edge 26 are basestrap brackets 36, which are used for attaching the flexible adjustable basestraps 16 to the ergonomic computer mouse 10. The mouse base 14 has 20 a front side 38 and an opposing back side 40. Referring now to FIG. 5A, there are two stabilizers 42 attached to the bottom side 35 of the mouse base 14. These stabilizers 42 are made of rubber, or any other suitable material, and one of the stabilizers 42 is attached near the front side 38 and the other is attached near the back side 40 of the base 14. Also attached to the bottom side 35 is the base mouseball housing 52, which provides access to the base mouseball motion tracking means 54 (shown in FIG. 10), and which allows the base mouseball 12 to protrude beyond the bottom side 35 of the mouse base 14 so that the base mouseball 12 can contact an external surface for proper operation. Referring to FIG. 10, carried within the mouse base 14 are computer processing means 56. The computer processing means 56 takes the electrical signals created by the mouse buttons 18 and the base mouseball motion tracking means 54 (or the optional miniature mouseball motion tracking means 58), and converts these signals into a mouse signal that is input to the computer 60 through the computer connecting cable 30. Preferably, the computer connecting cable 30 has a quick-release connector 44 that allows the user to be disconnected from the computer without having to remove the ergonomic computer mouse 10 from the user's hand.

In another embodiment the mouse signal transmitting means accomplished by the computer connecting cable 30 is replaced by a wireless interface 45, which uses some form of electromagnetic radiation, such as infrared or radio waves, to transmit signals to the computer. This wireless interface would be comprised of a wireless transmitter 46, which maybe contained within the mouse base 14, and a wireless receiver 48, which would receive the mouse signals being transmitted by the wireless transmitter 46, and which would be attached to the appropriate computer input port 62. The wireless interface 45 would either be powered by methods well known in the prior art such as by standard or rechargeable batteries or power cells, or by a standard AC power adapter.

Also, in another embodiment, the ergonomic computer mouse 10 can be used as an input device for electronic or computer gaming systems, which would use the mouse functions to accomplish various gaming functions. In this embodiment, the ergonomic computer mouse 10 would be connected to the electronic or computer gaming system 82 through a gaming system connecting cable 84 or through a wireless interface 45.

Figure 5A:
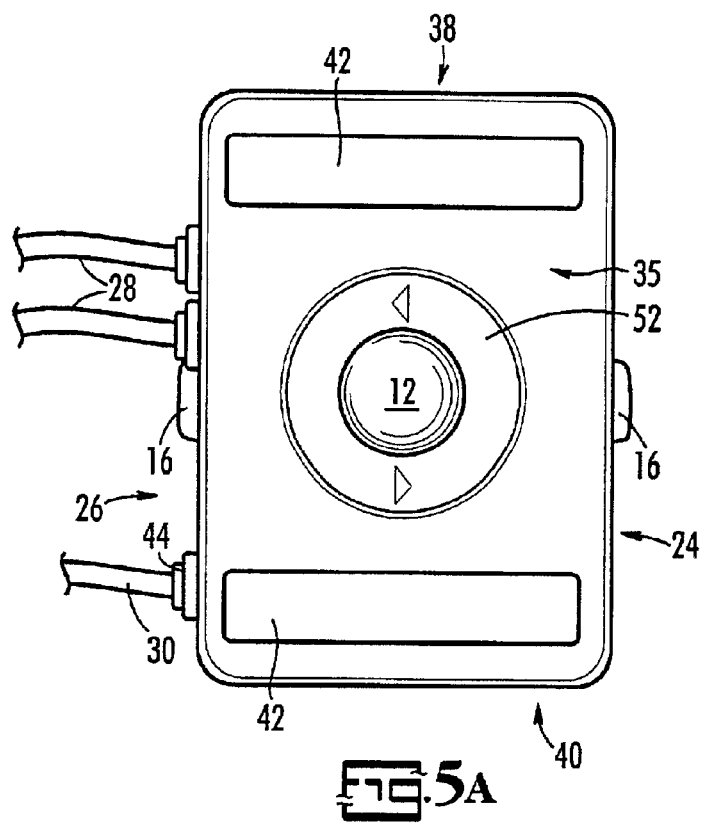
FIG. 5A is a bottom view of the ergonomic computer mouse base showing the mouseball, according to a preferred embodiment of the present invention.
Figure 5B:
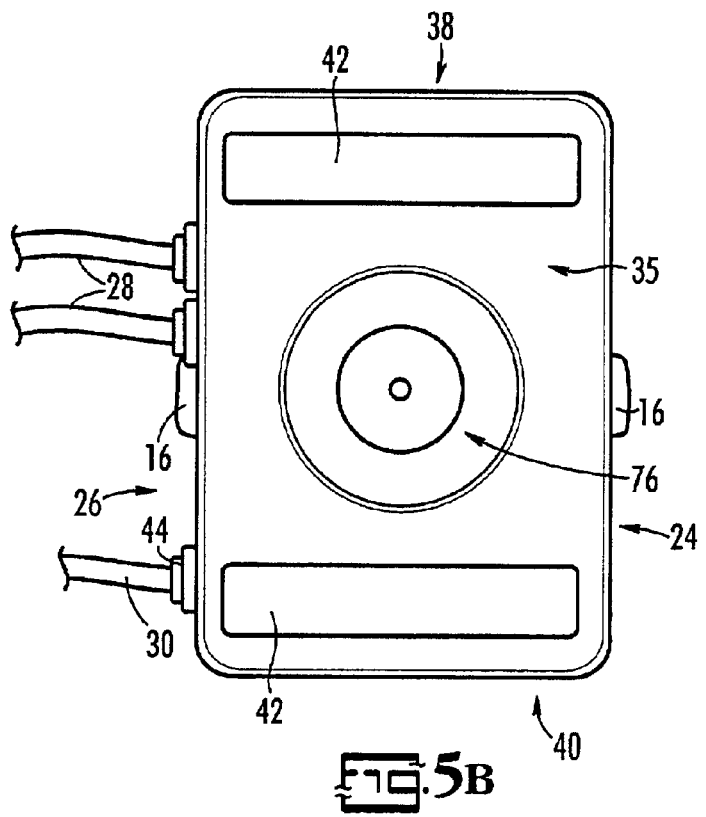
FIG. 5B is a bottom view of the ergonomic computer mouse base showing the optical motion sensor, according to another preferred embodiment of the present invention.
Figure 6:
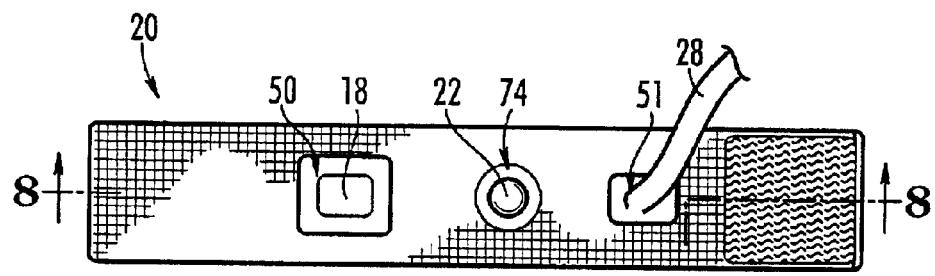
FIG. 6 is a top view of one of the fingerstraps of the ergonomic computer mouse, which shows the mouse button, optional miniature mouseball, and fingerstrap connecting cable, according to a preferred embodiment of the present invention.
Figure 7:
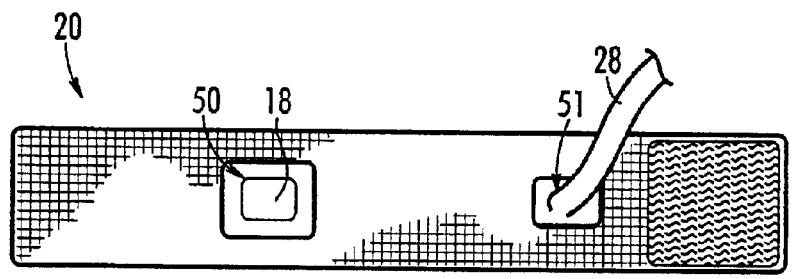
FIG. 7 is a top view of one of the fingerstraps of the ergonomic computer mouse, which shows the mouse button, and fingerstrap connecting cable, according to a preferred embodiment of the present invention.
Figure 8:
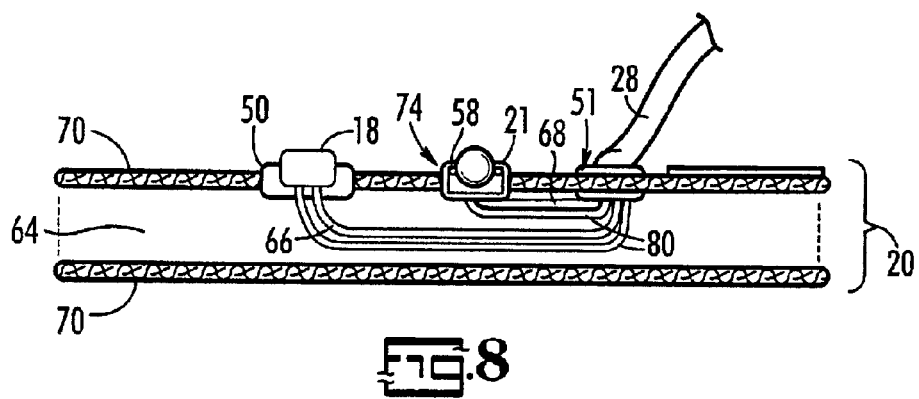
FIG. 8 is a side cross-section view of FIG. 6, taken along lines 8—8, according to a preferred embodiment of the present invention.
Figure 9:
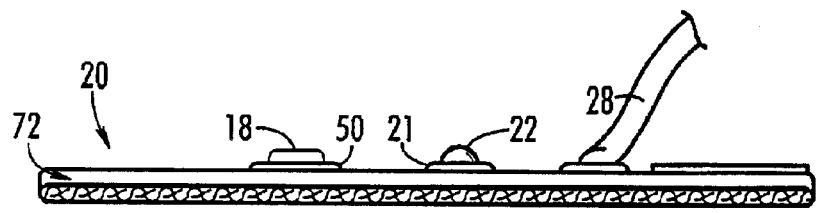
FIG. 9 is a side view of one of the fingerstraps of the ergonomic computer mouse, which shows the mouse button, optional mouseball and miniature mouseball housing, and fingerstrap connecting cable, according to a preferred embodiment of the present invention.

Also, in another embodiment, the base mouseball motion tracking means 54 is replaced by a metal oxide semiconductor (CMOS) optical sensor 76 (shown in FIGS. 5 and 10). This embodiment may contain a switching means 78 that would activate the optical sensor after the user's hand is rotated toward the "hand shake" position, or to some other use-appropriate position or orientation, and, once activated, the optical sensor 76 would then be able to develop an electrical input signal as a function of the movement of the base 14. Preferably, cursor positioning does not require the use of a "horizontal" surface, and can be accomplished by the user in various ways including, but not limited to, using the user's hip, leg, or other arm, as an optical reading surface, while walking, standing, or performing other types of tasks. Then, as described above, the signal would be processed by a computer processing means 56 and then input to the computer 60, either through a connecting cable 30 or 84, or by way of a wireless interface 45.

The mouse buttons 18 are standard momentary contact switches that have to be depressed to make electrical contact, which would send a signal to the computer processing means 56 through the mouse button wiring 66, which are carried by fingerstrap connecting cables 28. These mouse buttons 18 in combination with the mouse button wiring 66, connecting cabling 28 and 30 or the wireless interface 45, and the computer processing means 56, will be able to provide all standard mouse button function signals to the computer 60, including, but not limited to, clicking, double-clicking pointing, dragging, and scrolling; through the use of the computer processing means 56 the mouse buttons 18 are programmable, e.g., one mouse button 18 can be programmed to do all standard left mouse button functions, and the other mouse button 18 can be programmed to do all standard right mouse button functions. Referring now to FIGS. 6–10, in the preferred embodiment each mouse button 18 is attached to a separate flexible adjustable fingerstrap 20. In the preferred embodiment each fingerstrap 20 is comprised of two sleeve halves 70, which form a hollow sleeve 64 (as shown in exploded view in FIG. 8) when the two sleeve halves 70 are joined together. The sleeve halves 70 can be joined by sewing or gluing the edges together, for example, or by any other suitable means that will allow for the hollow sleeve 64 to be formed. The hollow sleeve 64 may carry a portion of a mouse button 18, mouse button wiring 66, power wiring 80, and may carry a portion of a fingerstrap connecting cable 28. One of the two sleeve halves 70 also has cutout portions 50 and 51 formed thereon. Each mouse button 18 is attached to, or is carried, inside of the hollow sleeve 64 so that the mouse button 18 protrudes outside of the cutout portion 50. Cutout portion 51 allows a portion of the fingerstrap connecting cable 28 to also be carried inside of the hollow sleeve 64 to provide a means for electrical communication between a mouse button 18 (and, possibly, the miniature mouseball motion tracking means 58), and the computer processing means 56, by carrying mouse button wiring 66 (and, possibly, by carrying miniature mouseball motion tracking means wiring 68), and power wiring 80. In another embodiment the mouse buttons 18, the mouse button wiring 66 (and, possibly, the miniature mouseball motion tracking means wiring 68), the power wiring 80, and the fingerstrap connecting cables 28, are connected to a flexible strip 72, which is attached to the outside of the fingerstraps 20. This flexible strip 72 can be made of plastic or any other insulator that will provide the flexibility needed to be able to have the bend radii necessary to be able to attach to a user's finger. Consequently, the wiring and the conductors (66, 68, 80 and possibly a portion of 28) carried within the strip have to have similar bend radii. In another embodiment, one of the fingerstraps 20 may also have a miniature mouseball housing 21, a miniature mouseball 22, and a miniature mouseball motion tracking means 58 attached. This miniature mouseball motion tracking means 58 will operate in the same way that the base mouseball motion tracking means 54 operates, and the miniature mouseball motion tracking means 58, the miniature mouseball motion tracking means wiring 68, and, at least a portion of, the miniature mouseball housing 21, will either be carried by a flexible strip 72 on the outside of the fingerstrap 20 or will be carried inside the hollow sleeve 64, as discussed above. If the miniature mouseball housing 21, the miniature mouseball 22, the miniature mouseball motion tracking means 58, and the miniature mouseball motion tracking means wiring 68, are carried inside the hollow sleeve 64, then another cutout portion 74 will be formed on the same sleeve half 70 that cutout portion 50 was formed on. This will allow a portion of the miniature mouseball 22 and possibly a portion of the miniature mouseball housing 21 or the miniature mouseball motion tracking means 58 to protrude outside of the hollow sleeve 64 so that the miniature mouseball 22 can be operated by the user's thumb.

Preferably, in operation, the user positions his hand so that the edge of the palm, below the little finger, is in contact with the rubber insert 34. The user then removably attaches the base 14 to the user's hand by manually adjusting the flexible basestraps 16 until the mouse base 14 is firmly, yet comfortably, secured to the user's hand. The user would then attach the flexible adjustable fingerstraps 20 onto either one or two of the user's fingers so that the mouse buttons 18 (and, possibly, the optional miniature mouseball 22) carried on said fingerstraps 20 are positioned so that they are easily operated by the user's thumb. The user would then connect the computer connecting cable 30 to computer 60 (or gaming system connecting cable 84 to gaming system 82) in order to connect the ergonomic computer mouse 10 to the computer 60 (or to a gaming system 82). Once the computer 60 (or the gaming system 82) is operational, the user would be able to: type on the computer keyboard (not shown), (or perform gaming functions), while wearing the ergonomic computer mouse 10. Furthermore, the user would be able to perform all standard mouse button functions by operating the mouse buttons 18 with the user's thumb, and would be able to reposition the computer cursor (or perform a gaming positioning function) by positioning the hand, on which the ergonomic computer mouse 10 is being worn, in the more user friendly "handshake" position, (which is a more user-friendly "natural" position, and which overcomes some of the problems of the prior art), and then moving the base mouseball 12 by using arm movements, as appropriate.

Other modifications and substitutions can be made to these preferred embodiments without departing from the spirit and scope of the present invention, defined by the appended claims.

What is claimed is:

1. A computer mouse that is worn on a computer user's hand, comprising:
   a base, said base having integrally formed strap brackets;
   a base attachment means for removably attaching said base to a user's hand;
   a computer processing means carried by said base for developing mouse signals for input into a computer;
   a mouseball housing attached to said base;
   a mouseball supported within said mouseball housing so that said mouseball is capable of rotational movement;
   a mouseball motion tracking means carried by said base for developing an electrical signal that corresponds to the rotational movement of said mouseball, said mouseball motion tracking means being in electrical contact with said computer processing means;
   a mouse button signal transmitting means connected to said base and in electrical contact with said base and said computer processing means for transmitting electrical signals to said computer processing means and for providing electrical power;
   a mouse button finger attaching means connected to said mouse button signal transmitting means for removably attaching mouse buttons to a user;
   a mouse button means connected to said mouse button finger attaching means, said mouse button means for providing mouse button function signals to said computer processing means, said mouse button means being in electrical contact with said mouse button signal transmitting means and said computer processing means; and
   a mouse signal transmitting means connected to said base and in electrical contact with said computer processing means, said mouse signal transmitting means for transmitting said mouse button function signals and said electrical signals from said mouseball motion tracking means to said computer, and for providing electrical power to said base and said computer processing means.

2. The computer mouse as recited in claim 1, wherein said base attachment means are adjustable straps, said straps are attached to said strap brackets.

3. The computer mouse as recited in claim 1, wherein said mouse button finger attaching means are adjustable fingerstraps.

4. The computer mouse as recited in claim 2, wherein said adjustable straps carry hook and loop fasteners.

5. The computer mouse as recited in claim 3, wherein said adjustable fingerstraps carry hook and loop fasteners.

6. The computer mouse as recited in claim 3, wherein said fingerstraps have a hollow sleeve formed therein.

7. The computer mouse as recited in claim 6, wherein said mouse button signal transmitting means is electrical wiring carried by a fingerstrap connecting cable, said fingerstrap connecting cable running from said fingerstrap to said base.

8. The computer mouse as recited in claim 7, wherein said electrical wiring is carried by said hollow sleeve for providing electrical communications and electrical power between said mouse button means and said computer processing means.

9. The computer mouse as recited in claim 8, further comprising a miniature mouseball motion tracking means, said miniature mouseball motion tracking means carried by said hollow sleeve of said fingerstrap, said miniature mouseball motion tracking means in electrical communications with said computer processing means.

10. The computer mouse as recited in claim 9, wherein said miniature mouseball motion tracking means further comprises:
    a miniature mouseball housing;
    a miniature mouseball, said miniature mouseball supported by said miniature mouseball housing so that said miniature mouseball is capable of providing mechanical movement that can be translated into an electrical signal that corresponds to the movement of said miniature mouseball by said miniature mouseball motion tracking means, said miniature mouseball housing attached to said fingerstrap, said miniature mouseball protruding from said hollow sleeve so that it can be operated by said user's thumb; and
    wiring, said wiring providing electrical power and communications between said miniature mouseball motion tracking means and said computer processing means.

11. The computer mouse as recited in claim 1, wherein said mouse button means are momentary contact switches.

12. The computer mouse as recited in claim 1, wherein said mouse signal transmitting means is a computer connecting cable, for connecting said mouse to said computer.

13. The computer mouse as recited in claim 12, wherein said computer connecting cable has a quick-release connector, said quick-release connector being removably attachable to said base.

14. The computer mouse as recited in claim 1, further comprising a rubber insert, said rubber insert being attached to the top of said base.

15. The computer mouse as recited in claim 1, wherein said mouse signal transmitting means is a wireless interface.

16. The computer mouse as recited in claim 15, wherein said wireless interface further comprises:
    a wireless transmitter, said wireless transmitter in electrical communications with said computer processing means; and
    a wireless receiver, said wireless receiver in electrical communication with said wireless transmitter and with said computer.

17. The computer mouse as recited in claim 1, wherein said mouse button finger attaching means further comprises a flexible strip for carrying a mouse button means wiring, a mouse button signal transmitting means wiring, and power wiring.

18. The computer mouse as recited in claim 17, wherein said flexible strip is attached to the exterior surface of a flexible adjustable fingerstrap.

19. A computer mouse that is worn on a computer user's hand, comprising:
    a base, said base having integrally formed strap brackets;
    a base attachment means for removably attaching said base to a user's hand;
    a computer processing means carried by said base for developing mouse signals for input into a computer;
    an optical motion sensor carried by said base for detecting movement of said base, said movement of said base being used for developing an electrical signal by said optical motion sensor that corresponds to the movement of said base, said optical motion sensor being in electrical contact with said computer processing means;
    a mouse button signal transmitting means connected to said base and in electrical contact with said base and said computer processing means for transmitting electrical signals to said computer processing means and for providing electrical power;

a mouse button finger attaching means connected to said mouse button signal transmitting means for removably attaching mouse buttons to a user;

a mouse button means connected to said mouse button finger attaching means, said mouse button means for providing mouse button function signals to said computer processing means, said mouse button means being in electrical contact with said mouse button signal transmitting means and said computer processing means; and a mouse signal transmitting means connected to said base and in electrical contact with said computer processing means, said mouse signal transmitting means for transmitting said mouse button function signals and said electrical signals from said optical motion sensor to a computer, and for providing electrical power to said computer mouse.

20. The method of using a computer mouse for providing mouse signals to a computer, comprising the steps of:

placing a user's hand so that the edge of the palm, below the little finger, is in contact with one side of a base of a computer mouse, said base containing a mouseball on the opposing side;

attaching said base to the user's hand by flexible straps until said mouse base is firmly, yet comfortably, secured to the user's hand;

attaching mouse button carrying fingerstraps to the user's hand so that mouse buttons, and, possibly, a miniature mouseball, can be operated by the user's thumb;

connecting said computer mouse to a computer by connecting a mouse signal transmitting cable from said base to said computer;

placing said computer in operation;

typing on a computer keyboard when not needing a mouse function from said computer mouse; and transmitting mouse signals to said computer with said computer mouse either by: initiating mouse button functions by depressing the appropriate mouse button on said fingerstraps with a thumb; or initiating cursor positioning either by positioning the hand, on which said computer mouse is being worn, in the "handshake" position and then moving said base mouseball by arm movement, or by rotating said miniature mouseball attached to one of said fingerstraps with a thumb.

21. The method of using a computer mouse for providing mouse signals to a gaming system, comprising the steps of:

placing a user's hand so that the edge of the palm, below the little finger, is in contact with one side of a base of a computer mouse, said base containing a mouseball on the opposing side;

attaching said base to the user's hand by flexible straps until said mouse base is firmly, yet comfortably, secured to the user's hand;

attaching mouse button carrying fingerstraps to the user's hand so that mouse buttons, and, possibly, a miniature mouseball, can be operated by the user's thumb;

connecting said computer mouse to a game device by connecting a mouse signal transmitting cable from said base to said gaming system;

placing said game device in operation; and transmitting mouse signals to said gaming system with said computer mouse either by: initiating mouse button functions by depressing the appropriate mouse button on said fingerstraps with a thumb; or initiating a positioning function either by positioning the hand, on which said computer mouse is being worn, in the "handshake" position and then moving said base mouseball by arm movement, or by rotating said miniature mouseball attached to one of said fingerstraps with a thumb.

* * * * *